Figure 1:
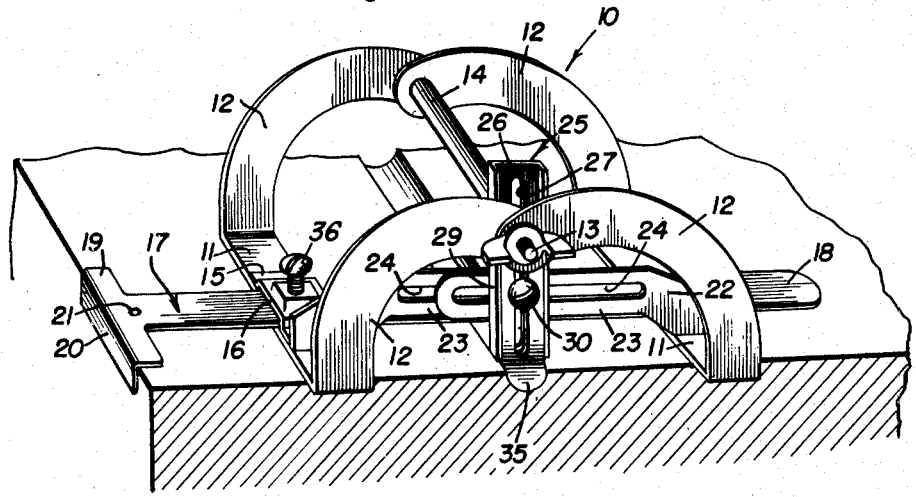

Sept. 19, 1950　　　　F. L. SCHULKINS　　　　2,522,803
HOLDER FOR GROOVING TOOLS

Filed Nov. 20, 1946　　　　　　　　　　　　2 Sheets-Sheet 1

Inventor
Frank L. Schulkins

By Clarence A. O'Brien
and Harvey B. Jacobson
Attorneys

Sept. 19, 1950     F. L. SCHULKINS     2,522,803
HOLDER FOR GROOVING TOOLS
Filed Nov. 20, 1946     2 Sheets-Sheet 2
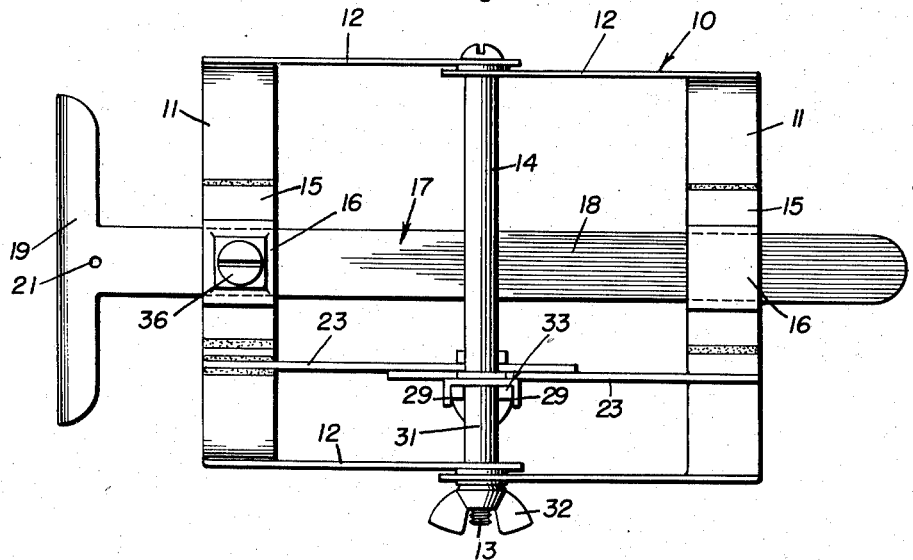
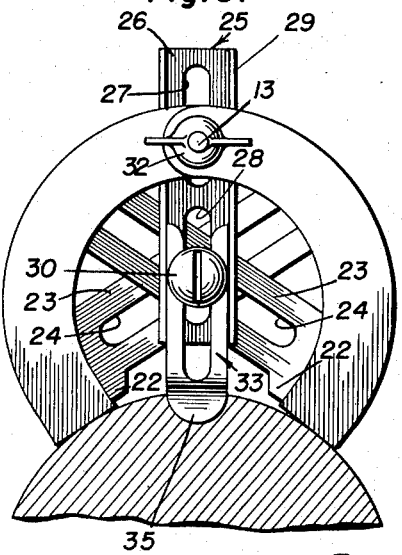
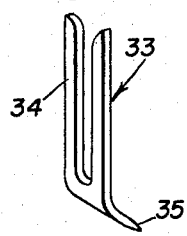
Inventor
Frank L. Schulkins Patented Sept. 19, 1950

2,522,803

UNITED STATES PATENT OFFICE 2,522,803

HOLDER FOR GROOVING TOOLS

Frank L. Schulkins, Joaquin, Tex.

Application November 20, 1946, Serial No. 711,098

7 Claims. (Cl. 144—136)

This invention relates to a tool holder and has for its primary object to facilitate the precision carving of wood.

Another object is accurately to groove a wooden block for the production of inlay work and the like.

A further object is to enable grooves to be cut in the block not only along straight lines, but also in arcs.

The above and other objects may be attained by employing this invention which embodies, among its features, a pair of spaced parallel base bars, a leg at each end of each base bar, each leg curving away from its respective base bar in a plane which lies perpendicular to the base bars, a pivot bolt joining the legs of one base bar with those of the other base bar along an axis remote from both base bars, and a tool holder mounted on the pivot bolt for adjustment along an axis which lies perpendicular to the longitudinal axis of the pivot bolt.

Other features include arms carried by the base bars for engagement with the tool holder to lock the tool holder against accidental movement, guides carried by the base bars, a gauge bar slidable through the guides along an axis perpendicular to the axis of the pivot bolt and a clamp screw in one of the guides to hold the gauge bar in adjusted position in the guides.

Figure 2:
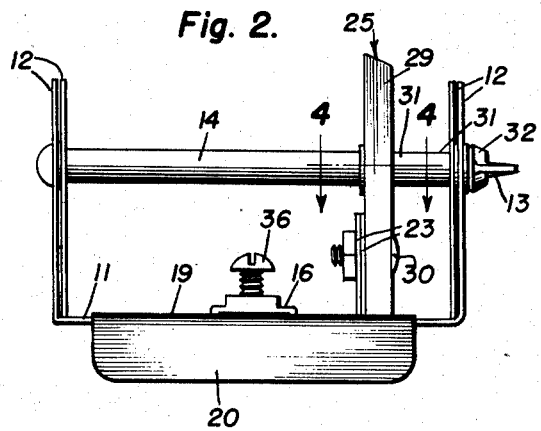
Figure 4:
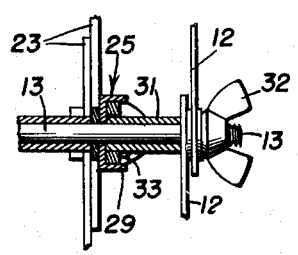

In the drawings:

Figure 1 is a perspective view of a tool holder embodying the features of this invention illustrating a tool mounted therein and the device in use to carve a groove in a wooden block parallel with one side edge thereof, Figure 2 is an edge view of the tool holder illustrated in Figure 1, Figure 3 is a top plan view of the tool holder, Figure 4 is a sectional view taken substantially along the line 4—4 of Figure 2, Figure 5 is an edge view of the tool holder showing it in another position and arranged for carving the groove in a circular cylindrical wooden body, and Figure 6 is a perspective view of a tool adapted for use with this tool holder.

Referring to the drawings in detail, this improved tool holder, designated generally 10, comprises a pair of identical members each of which comprises a base bar 11 from opposite ends of which rise legs 12 which curve away from their respective base bars 11 in planes perpendicular to the plane of the base bars. As illustrated, the ends of the legs 12 remote from their respective base bars are arranged in overlapping relation and are pierced to receive a pivot and clamping bolt 13 which lies along an axis parallel with the longitudinal axes of the base bars 11. Surrounding the clamping bolt is a spacing sleeve 14 which, as illustrated in Figures 2, 3 and 4, is of somewhat less length than the length of the bolt 13.

Secured to each base bar 11 intermediate its ends is a bracket 15 which, as illustrated in the drawings, is provided with an inverted U-shaped portion 16 to form a guide for a gauge bar, designated generally 17. The gauge bar 17 comprises a tongue 18 which is adapted to extend through the guides 16 and formed at one end of the tongue is a head 19 which is provided along the edge remote from the tongue with a downturned flange 20. Formed in the tongue 18 adjacent the head 19 is an opening 21, the purpose of which will be more fully hereinafter explained.

Bent upwardly from one end of each bracket 15 and lying in a plane perpendicular to the plane of the respective base bars 11 is an upwardly and inwardly inclined arm 22 provided with an angular extension 23 formed with a longitudinal slot 24. As illustrated, these arms 23 extend toward one another and their longitudinal axes intersect an axis which lies parallel with the axis of the bolt 13. The tool holder, designated generally 25, comprising a channel member 26 provided in its web portion with longitudinally spaced, longitudinal slots 27 and 28, is mounted on the bolt 13 adjacent one end of the spacing sleeve 14, with the flanges 29 of the channel member 26 turned away from the sleeve. The longitudinal axes of the slots 27 and 28 intersect the axis intersected by the axes of the arms 23, and projected through the slots 24 and 28 is a clamping bolt 30. Surrounding the bolt 13 between the outer face of the tool holder 25 and the inner face of an adjacent arm 12 is a spacing sleeve 31, and threaded on the adjacent end of the bolt 13 is a wing-nut 32 so that, upon tightening the nut 32, the parts will be drawn together into frictional contact and held in proper adjusted positions.

A tool, designated generally 33, comprising a longitudinally slotted shank portion 34 provided at one end with a cutting blade 35 of any suitable form, is slipped into the tool holder 25 between the flanges 29 with the head of the screw 30 overlying the shank 34 on opposite sides of the longitudinal groove therein. By loosening the screw 30, it is obvious that the tool may be adjusted to cut a groove of the desired depth, and by tightening the screw 30, it will be locked in adjusted position.

In use, the tool is inserted in the tool holder with the blade 35 set to cut a groove of the desired depth and assuming that the groove is to be cut in a block of rectangular form, the gauge 17 is moved so that when the flange 20 engages the side edge of the block, the blade 33 will be in a position to cut the groove in the proper relation to the edge of the block. A set screw 36 which passes through one of the guides 16 impinges against the blade 18 of the gauge 17 and locks the parts in proper relation. The tool is then moved as a unit with the tool holder and gauge longitudinally of the block to be cut until the groove formed therein is of the desired depth. Should it be desired to cut a circular groove, the gauge 17 is extracted from the guides 16 and turned so that the flange 20 projects upwardly. A small nail or brad is then driven into the wood through the opening 21 to form a center about which the tool may be swung with the holder 10 to cut a groove of the desired depth. By loosening the set screw 36 and removing the gauge 17, the device may be employed to cut grooves in circular cylindrical surfaces, as illustrated in Figure 5. It will thus be seen that a tool having a multitude of uses in wood carving has been provided.

While in the foregoing there has been shown and described the preferred embodiment of this invention, it is to be understood that minor changes in the details of construction and combination and arrangement of parts may be resorted to without departing from the spirit and scope of the invention as claimed.

What I claim is:

1. A tool holder comprising a pair of spaced parallel elongated base bars, a leg at each end of each base bar, the legs of one base bar curving toward the legs of the other base bar, a pivot bolt joining the legs of the base bars near their ends remote from the base bars, and a tool support mounted on the pivot bolt for radial adjustment.

2. A tool holder comprising a pair of spaced parallel elongated base bars, a leg at each end of each base bar, the legs of one base bar curving toward the legs of the other base bar, a pivot bolt joining the legs of the base bars near their ends remote from the base bars, a tool support mounted on the pivot bolt for radial adjustment, overlapping arms carried by the base bars, said arms lying along axes which intersect an axis which lies parallel with the axis of the pivot bolt and the longitudinal axis of the tool support, and a clamp screw extending through the arms and the tool support to cooperate with the pivot bolt in holding the tool support rigid.

3. A tool holder comprising a pair of spaced parallel elongated base bars, a leg at each end of each base bar, the legs of one base bar curving toward the legs of the other base bar, a pivot bolt joining the legs of the base bars near their ends remote from the base bars, a tool support mounted on the pivot bolt for radial adjustment, a guide intermediate the ends of each base bar, a gauge bar slidable through the guides and means to lock the gauge bar in adjusted position in the guides.

4. A tool holder comprising a pair of spaced parallel elongated base bars, a leg at each end of each base bar, the legs of one base bar curving toward the legs of the other base bar, a pivot bolt joining the legs of the base bars near their ends remote from the base bars, a tool support mounted on the pivot bolt for radial adjustment, and guide flanges on the tool support to hold a cutting tool in longitudinal alignment therewith.

5. A tool holder comprising a pair of spaced parallel elongated base bars, a leg at each end of each base bar, the legs of one base bar curving toward the legs of the other base bar, a pivot bolt joining the legs of the base bars near their ends remote from the base bars, a tool support mounted on the pivot bolt for radial adjustment, an arm carried by each base bar, said arms extending toward one another in overlapping relation and engaging the tool support, means extending through the arms and tool support to lock the tool support against accidental movement, and a guide flange along each side edge of the tool support to hold a cutting tool in longitudinal alignment therewith.

6. A tool holder comprising a pair of spaced parallel elongated base bars, a leg at each end of each base bar, the legs of one base bar curving toward the legs of the other base bar, a pivot bolt joining the legs of the base bars near their ends remote from the base bars, a tool support mounted on the pivot bolt for radial adjustment, overlapping arms carried by the base bars, said arms lying along axes which intersect an axis which lies parallel with the axis of the pivot bolt and the longitudinal axis of the tool support, a clamp screw extending through the arms and tool support to cooperate with the pivot bolt in holding the tool support rigid, and a guide flange along each side edge of the tool support to hold a cutting tool in longitudinal alignment therewith.

7. A tool holder comprising a pair of spaced parallel elongated base bars, a leg at each end of each base bar, the legs of one base bar curving toward the legs of the other base bar, a pivot bolt joining the legs of the base bars near their ends remote from the base bars, a tool support mounted on the pivot bolt for radial adjustment, overlapping arms carried by the base bars, said arms lying along axes which intersect an axis which lies parallel with the axis of the pivot bolt and the longitudinal axis of the tool support, a clamp screw extending through the arms and tool support to cooperate with the pivot bolt in holding the tool support rigid, a guide intermediate the ends of each base bar, a gauge bar slidable through the guides along an axis perpendicular to the axis of the pivot bolt and a clamp screw in one of the guides to hold this gauge bar in adjusted position in the guides.

FRANK L. SCHULKINS.

REFERENCES CITED

The following references are of record in the file of this patent:

UNITED STATES PATENTS

| Number | Name | Date |
|---|---|---|
| 554,466 | Topping et al. | Feb. 11, 1896 |
| 763,941 | Butcher | June 28, 1904 |
| 1,586,314 | Kiefer | May 25, 1926 |
| 2,231,267 | Giddings | Feb. 11, 1941 |
| 2,353,794 | Svikhart | July 18, 1944 |